United States Patent [19]

Saitoh et al.

[11] E Re. 31,236

[45] Reissued May 10, 1983

[54] METHOD OF REMOVING SULFUR DIOXIDE FROM COMBUSTION EXHAUST GAS

[75] Inventors: Shigeru Saitoh; Tetsuya Watanabe; Koji Konno; Kunihide Yaguchi; Kenji Kodama; Tamostu Miyamori, all of Iwaki, Japan

[73] Assignee: Kureha Kagaku Kogyo Kabushiki Kaisha, Tokyo, Japan

[21] Appl. No.: 136,531

[22] Filed: Apr. 2, 1980

Related U.S. Patent Documents

Reissue of:

[64] Patent No.: 3,928,537
Issued: Dec. 23, 1975
Appl. No.: 440,381
Filed: Feb. 7, 1974

[30] Foreign Application Priority Data

Feb. 10, 1973 [JP] Japan ..... 48-16919

[51] Int. Cl.[3] ..... C01B 17/00

[52] U.S. Cl. ..... 423/243; 423/166; 423/512 A

[58] Field of Search ..... 423/242 A, 242 R, 243, 423/166, 512 A, 555

[56] References Cited

U.S. PATENT DOCUMENTS

| | | | |
|---|---|---|---|
| Re. 21,631 | 11/1940 | Johnstone | 23/178 |
| 706833 | 6/1941 | DE2 . | |
| 1792485 | 2/1972 | DEX . | |
| 2,086,379 | 7/1937 | Clark | 23/178 |
| 2,122,544 | 7/1938 | Girsewald et al. | 423/243 |
| 2,134,482 | 10/1938 | Johnston | 423/243 |
| 2,142,987 | 1/1939 | Bacon et al. | 23/178 |
| 2,161,633 | 6/1939 | Baehr et al. | 423/243 |
| 2,192,461 | 3/1940 | Girsewald et al. | 423/243 |
| 2,251,216 | 7/1941 | Woodhouse | 423/243 |
| 3,632,306 | 1/1972 | Villiers-Fisher et al. | 23/2 SQ |
| 3,687,615 | 4/1972 | Gorin et al. | 423/243 |
| 3,690,818 | 9/1972 | Gorin et al. | 423/243 |
| 3,690,824 | 9/1972 | Gorin et al. | 423/243 |
| 3,757,488 | 9/1973 | Austin et al. | 55/73 |
| 3,798,309 | 3/1974 | Knowles et al. | 423/243 |
| 3,833,508 | 9/1974 | Austin et al. | 252/189 |
| 3,840,638 | 10/1974 | Morita et al. | 423/166 |

FOREIGN PATENT DOCUMENTS

| | | | |
|---|---|---|---|
| 101738 | 7/1937 | Australia | 423/243 |
| 642244 | 3/1937 | Fed. Rep. of Germany . | |
| 706833 | 6/1941 | Fed. Rep. of Germany . | |
| 858693 | 12/1952 | Fed. Rep. of Germany . | |
| 1171403 | 12/1964 | Fed. Rep. of Germany . | |
| 2123773 | 11/1971 | Fed. Rep. of Germany . | |
| 1792485 | 2/1972 | Fed. Rep. of Germany . | |
| 21-172814 | 5/1946 | Japan . | |
| 443314 | 2/1936 | United Kingdom | 423/243 |
| 1191427 | 5/1970 | United Kingdom . | |
| 1323931 | 7/1973 | United Kingdom . | |

OTHER PUBLICATIONS

Sulphur, No. 100, pp. 94–95, May–Jun. 1972.

*Primary Examiner*—O. R. Vertiz
*Assistant Examiner*—Gregory A. Heller
*Attorney, Agent, or Firm*—Wegner & Bretschneider

[57] ABSTRACT

A method of removing sulfur dioxide from combustion exhaust gas containing sulfur dioxide by contacting the exhaust gas with an aqueous solution containing at least one organic acid salt expressed by the formula

RCOOM (wherein R represents H, $CH_3$, $C_2H_5$ or $C_3H_7$, and M represents an alkali metal or $NH_4$) to efficiently dissolve sulfur dioxide contained in the gas in the form of a sulfite in the aqueous solution by reacting the sulfur dioxide with the salt. The resultant solution which dissolves the sulfite may be contacted with a calcium compound for producing calcium sulfite by reaction of the sulfite with the calcium compound thereby effectively removing the sulfur dioxide in the form of calcium sulfite from the combustion exhaust gas. Alternatively, the sulfite-dissolving aqueous solution may be contacted with oxygen or air for oxidizing the sulfite contained in the solution into a sulfate, followed by contacting the sulfate, which is now dissolved in the aqueous solution, with a calcium compound. The sulfate is satisfactorily reacted with the calcium compound to produce calcium sulfate and thus sulfur dioxide may be effectively ultimately removed in the form of calcium sulfate from the combustion exhaust gas.

8 Claims, 2 Drawing Figures

METHOD OF REMOVING SULFUR DIOXIDE FROM COMBUSTION EXHAUST GAS

Matter enclosed in heavy brackets [ ] appears in the original patent but forms no part of this reissue specification; matter printed in italics indicates the additions made by reissue.

This invention relates to a method of removing sulfur dioxide from combustion exhaust gas and more particularly, to a method of effectively removing sulphur dioxide from combustion exhaust gas, without reduction in efficiency of removal of sulfur dioxide from the exhaust gas, by contacting a sulfur dioxidecontaining combustion exhaust gas with an aqueous solution containing an organic acid salt or salts expressed by the formula

RCOOM (wherein R represents H, $CH_3$, $C_2H_5$ or $C_3H_7$, and M represents an alkali metal or $NH_4$) to convert the sulfur dioxide into a sulfite and to dissolve the sulfite in the aqueous solution.

BACKGROUND OF THE INVENTION

There have been heretofore proposed a variety of methods of removing sulfur dioxide, which often undesirably exists in combustion exhaust gas, from the exhaust gas.

For example, in a typical wet-type method, the combustion exhaust gas is contacted with an alkali sulfite-containing aqueous solution, whereby sulfur dioxide contained in the exhaust gas is absorbed in the aqueous solution to react with the alkali sulfite, producing alkali bisulfite. Slaked lime (calcium hydroxide) or calcium carbonate is added to the resultant aqueous alkali bisulfite solution to form calcium sulfite, thereby removing the sulfur dioxide in the form of calcium sulfite from the combustion exhaust gas. Furthermore, the thus remove calcium sulfite may be oxidized for producing calcium sulfate, i.e., the sulfur dioxide is ultimately removed in the form of calcium sulfate from the combustion exhaust gas. The reaction mechanisms of the wet-type method are represented by the following formulae (1), (2) and (3) where sodium sulfite is used as the alkali sulfite, with oxidation of calcium sulfite according to formula (4).

$$Na_2SO_3 + SO_2 + H_2O \rightarrow 2NaHSO_3 \quad (1)$$

$$2NaHSO_3 + CaCO_3 \rightarrow CaSO_3 + Na_2SO_3 + CO_2 + H_2O \quad (2)$$

$$2NaHSO_3 + Ca(OH)_2 \rightarrow CaSO_3 + Na_2SO_3 + 2H_2O \quad (3)$$

$$CaSO_3 + 1/2O_2 \rightarrow CaSO_4 \quad (4)$$

However, when the combustion exhaust gas is contacted with the aqueous alkali sulfite solution for reaction of sulfur dioxide with the alkali sulfite in accordance with the wet-type method, part of the alkali sulfite is inevitably oxidized into an alkali sulfate by means of oxygen which is also contained in the exhaust gas.

When such alkali suflate accumulates to a significant degree in the alkali sulfite-containing aqueous solution, the quantity of alkali sulfite in the solution, available for reaction with sulfur dioxide, decreases to reduce the rate of sulfur dioxide absorption and efficiency. The alkali sulfate, which accumulates as a by-product, is only slightly reactive with slaked lime or calcium carbonate which is added to the alkali bisulfite-containing aqueous solution for the purpose of forming calcium sulfite. The alkali sulfate thus produced must be removed in advance from the alkali bisulfite solution by a suitable method.

Furthermore, there is known another method of removing sulfur dioxide in the form of calcium sulfite from combustion exhaust gas, wherein a calcium compound such as calcium hydroxide, calcium carbonate or the like is employed in the form of a slurry. In this method, sulfur dioxide can be eliminated in the form of calcium sulfite from combustion exhaust gas in accordance with the following formula (5).

$$Ca(OH)_2 + SO_2 \rightarrow CaSO_3H_2O \quad (5)$$

The resultant calcium sulfite is converted by oxidation into calcium sulfate in accordance with the afore-mentioned reaction formula (4). However, this method is disadvantageous in that, when calcium carbonate is used as a calcium compound, the efficiency of collecting sulfur dioxide from the combustion exhaust gas is reduced since calcium carbonate exhibits extremely low solubility in water and the velocity of reaction of calcium carbonate with sulfur dioxide is lower than that of a water-soluble alkali sulfite. This method is also disadvantageous in that, when calcium hydroxide, which has a relatively high solubility in water, is employed as a calcium compound, the efficiency of collecting sulfur dioxide is similarly reduced since calcium hydroxide is easily converted into calcium carbonate having lower solubility in water by reaction with carbon dioxide which generally exists in combustion exhaust gas in an amount far greater than sulfur dioxide. In order to overcome the above disadvantages, there has been proposed, for example, in U.S. Pat. No. 3,632,306, a method of adding a weak acid such as acetic acid to the slurry of a calcium compound to produce a calcium salt of a weak acid for increasing the concentration of calcium ions in the slurry.

The method of the above U.S. Pat. appears theoretically reasonable at first sight since a part of the calcium carbonate or calcium hydroxide, which is insoluble or sparingly soluble in water, is formed into a water-soluble calcium salt by means of a small amount of a weak acid and then sulfur dioxide in the exhaust gas is collected by means of the resultant calcium salt containing aqueous solution. However our experiments revealed that the efficiency of absorbing sulfur dioxide from the exhaust gas in accordance with the method of the above U.S. patent is yet insufficient in comparison with a method using a solution of a water-soluble salt such as alkali sulfite (when determined by the use of the same apparatus). This is considered due to the following reasons.

For example, when acetic acid is used as a weak acid, sulfur dioxide is absorbed in the solution by the following reaction formulae (6) and (7)

$$CaCO_3 + 2CH_3COOH \rightarrow (CH_3COO)_2Ca + CO_2 + H_2O \quad (6)$$

$$(CH_3COO)_2Ca + SO_2 + H_2O \rightarrow CaSO_3 + 2CH_3COOH \quad (7)$$

In order to absorb sulfur dioxide contained in the combustion exhaust gas into an absorbing solution in accordance with the formula (7), a sufficient amount of calcium acetate is essentially required to exist in the solution. However, the reaction velocity for producing calcium acetate according to formula (6) is considered relatively slow because the acetic acid produced in accordance with formula (7) is moved through the solution by diffusion from a point at which the sulfur dioxide is contacted with calcium acetate to a point at which calcium carbonate exists in the solution to react with calcium carbonate in situ and then the resultant calcium acetate is moved by diffusion to the point for contact with sulfur dioxide. In general, a weak acid such as acetic acid reacts at a relatively low velocity with a solid compound such as calcium carbonate. Moreover, part of sulfurous acid produced by dissolution of sulfur dioxide into the solution is moved onto surfaces of calcium carbonate particles, due to the slow production velocity of calcium acetate as previously mentioned, to react therewith for production of calcium sulfite. The calcium sulfite thus produced is insoluble in water and covers the surfaces of the particles. Accordingly, the production velocity of calcium acetate will be further lowered due to reduction in surface areas of calcium carbonate particles capable of contacting with acetic acid. The calcium sulfite thus produced has an extremely small particle size. When the calcium sulfite is oxidized into calcium sulfate, the resultant calcium sulfate has also an extremely small particle size. In this connection, it is generally difficult to separate calcium sulfite or calcium sulfate from the solution by filtration under sufficient washing. Therefore, the method of the above U.S. Patent has disadvantages resulting from the use of a calcium compound in the form of a slurry in the reaction system i.e., efficiencies in operation, maintenance and control of the reaction apparatus are lowered and the slurry of a calcium compound tends to adhere to inner walls of the reaction apparatus, producing so-called "scales".

It is, accordingly, desirable to effectively remove sulfur dioxide from combustion exhaust gas in a simple procedure without reducing the efficiency in removing sulfur dioxide from combustion exhaust gas and without forming scales on inner walls of a reactor.

SUMMARY OF THE INVENTION

It is therefore an object of the present invention to provide a novel method of removing sulfur dioxide from combustion exhaust gas in an efficient manner.

It is another object of the present invention to provide a novel method of efficiently removing sulfur dioxide in the form of a mixture of calcium sulfite and calcium sulfate from combustion exhaust gas.

It is a further object of the present invention to provide a novel method of efficiently removing sulfur dioxide in the form of calcium sulfate alone from combustion exhaust gas.

Other and further objects and advantages of the present invention will become apparent from the following description.

The present inventors have studied on a method which uses a sulfur dioxide-absorbent aqueous solution for continuous removal of sulfur dioxide from combustion exhaust gas without reduction in efficiency, by which sulfur dioxide can be effectively removed from combustion exhaust gas without forming scales on inner wall surfaces of an absorbing apparatus and in which a solution, which has absorbed sulfur dioxide, can be cyclically re-used for removal of sulfur dioxide from a combustion exhaust gas. As a result, it has been found that organic acid salts of a particular nature are suitable as an absorbent for the removal of sulfur dioxide from combustion exhaust gas. Actually, when an aqueous solution of an organic acid salt is contacted with the sulfur dioxide-containing combustion exhaust gas, it has been found that sulfur dioxide is efficiently reacted with the organic acid salt without producing unwanted by products, which obstruct the absorption of sulfur dioxide, and dissolved in the form of a sulfite in the aqueous solution. Furthermore, the contact of a calcium compound with the resultant aqueous solution results in good reaction of the sulfite in the solution with the calcium compound to produce calcium sulfite. When the aqueous solution, which dissolves the sulfite therein, is contacted with oxygen or air for oxidation of the sulfite in the solution into a sulfate, followed by contacting a calcium compound with the sulfate-containing aqueous solution, the reaction of the sulfate in the aqueous solution with the calcium compound proceeds in a satisfactory manner to produce calcium sulfate. The present invention is based upon the above findings.

The present invention is characterized by contacting a sulfur dioxide-containing combustion exhaust gas with an aqueous solution containing at least one organic acid salt expressed by the formula

RCOOM (wherein R represents H, $CH_3$, $C_2H_5$ or $C_3H_7$ and M represents an alkali metal or $NH_4$). As described hereinbefore, both reaction and production systems of the present invention are in liquid phase, so that processing operations are advantageously simplified. Moreover, when the resultant sulfite is oxidized, calcium sulfate can be produced in a relatively high purity. This is extremely advantageous in practical applications of calcium sulfate obtained.

DETAILED DESCRIPTION OF THE INVENTION

Figure 1:
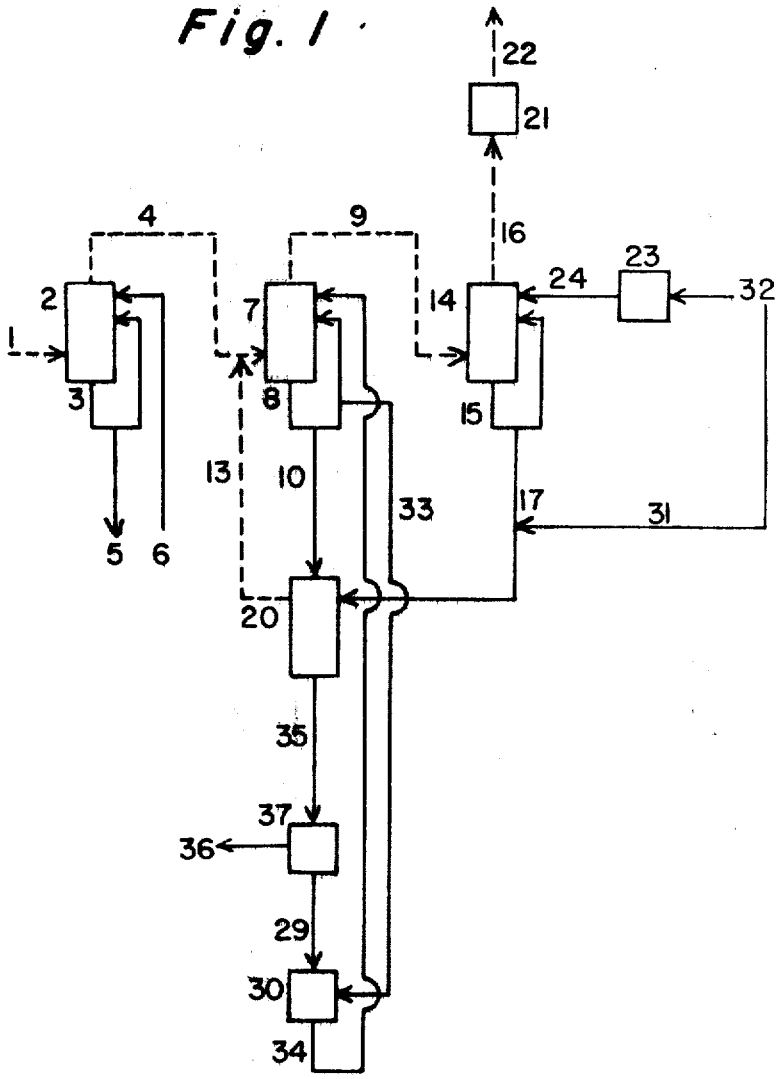
FIG. 1 is a flow chart illustrating one embodiment of the present invention wherein sulfur dioxide in combustion exhaust gas is formed into a sulfite which is in turn converted into calcium sulfite.

As described hereinbefore, in the present invention, a sulfur dioxide-containing combustion exhaust gas is contacted with an aqueous solution containing at least one organic acid salt represented by the formula

RCOOM (wherein R represents H, $CH_3$, $C_2H_5$ or $C_3H_7$ and M represents an alkali metal or $NH_4$).

As a result, sulfur dioxide existing in combustion exhaust gas is reacted with the organic acid salt to form a sulfite ($M_2SO_3$). When an excess of sulfur dioxide is passed through the aqueous solution, the sulfite ($M_2SO_3$) is converted into a bisulfite ($MHSO_3$) which is easily dissolved in the aqueous solution, as shown in reaction formulae (8) and (9)

$$2RCOOM + SO_2 + H_2O \rightarrow 2RCOOH + M_2SO_3 \quad (8)$$

$$M_2SO_3+SO_2+H_2O \rightarrow 2MHSO_3 \quad (9)$$

whereas the organic acid salt is converted into a free acid in the aqueous solution. The term "an aqueous solution dissolving a sulfite" or "a sulfite-dissolving aqueous solution" described herein intends to mean an aqueous solution which dissolves a sulfite and/or a bisulfite in the form $M_2SO_3$ and/or $MHSO_3$.

The organic acid salts useful in the present invention include, for example, salts of an alkali metal such as sodium, potassium, lithium or the like with a monobasic acid such as formic acid, acetic acid, propionic acid, butyric acid or the like, and ammonium salts of the just-mentioned monobasic acids. Alkali metal or ammonium ions, which are generated when the organic acid salt is dissolved in water, exhibit extremely high activity with sulfur dioxide. Accordingly, when the sulfur dioxidecontaining combustion exhaust gas is contacted with the aqueous solution containing the organic acid salt, sulfur dioxide is converted into a sulfite in an extremely efficient manner. Since the organic acid salt does not react directly with oxygen or carbon dioxide existing in the exhaust gas, undesirable by-products are not produced. Thus, the efficiency of removing sulfur dioxide from the exhaust gas is not lowered. The resultant solution dissolving the sulfite further includes a small amount of a sulfate which is produced as a result of oxidation of a portion of the sulfite by means of oxygen, which is contained in the exhaust gas. Since the sulfite and sulfate are highly soluble in water and scales are hardly formed on inner walls of a reactor.

It will be noted that the organic acid salt has high solubility in water and is advantageous in practical applications and that when the exhaust gas is contacted with the aqueous solution containing the salt, the reaction of sulfur dioxide with the salt in the solution is not prevented by the free acid formed in the solution since the free acid is weaker in acidity than sulfurous acid ($H_2SO_3$). Thus, it is possible to maintain a high degree of efficiency in the absorption of sulfur dioxide in the aqueous solution. The organic acid salts may be used singly or in combination. The concentration of the organic acid salt in the solution is not critical and the organic acid salt may be dissolved in a suitable concentration below a saturating level. It should be noted that the organic acid salts may, of course, coexists with a sulfite, a sulfate and organic acids in the aqueous solution in practical application. The temperature at which sulfur dioxide-containing combustion exhaust gas is contacted with the organic acid salt-containing aqueous solution is not critical and may be within a range which is employed in a priorart method using an alkali sulfite containing aqueous solution as in the wet-type method described hereinbefore. Particularly, the temperature is preferred to be within a range of from room temperature to 90° C.

As will be apparent from the foregoing, sulfur dioxide in combustion exhaust gas can be effectively removed from the gas by contacting the gas with the aqueous solution containing the organic acid salt.

A sulfite and a sulfate, which are obtained by contacting the sulfur dioxide-containing gas with the abovementioned organic acid salt, can be removed in the form of calcium sulfite and calcium sulfate by interacting the same and a calcium compound. In this connection, where there is used as a calcium compound an inorganic calcium compound such as calcium carbonate, calcium hydroxide, calcium oxide or the like, a free acid, which is derived from the organic acid salt dissolved in the aqueous solution, first reacts with, for example, calcium carbonate to form a calcium salt, which is dissolved in the aqueous solution. Then, the thus dissolved calcium salt reacts with the sulfite to produce calcium sulfite together with the free acid which in turn reacts with unreacted calcium carbonate and the organic acid salt is regenerated. In this manner, calcium sulfite is cyclically produced. As described hereinbefore, the sulfite-containing aqueous solution may include a small amount of a sulfate in addition to the sulfite. The sulfate is also reacted with the abovementioned calcium salt to produce calcium sulfate together with an organic acid salt regenerated in the same manner as in the sulfite. Accordingly, the calcium sulfite produced includes a small amount of calcium sulfate.

The above-mentioned reactions are carried out in accordance with the following reaction formulae (10) through (13)

$$2RCOOH+CaCO_3 \rightarrow (RCOO)_2Ca+CO_2+H_2O \quad (10)$$

$$M_2SO_3+(RCOO)_2Ca \rightarrow CaSO_3+2RCOOM \quad (11)$$

$$MHSO_3+(RCOO)_2Ca \rightarrow CaSO_3+RCOOM+RCOOH \quad (12)$$

$$M_2SO_4+(RCOO)_2Ca \rightarrow CaSO_4+2RCOOM \quad (13)$$

(wherein R and M have the same meaning as defined hereinbefore, respectively).

As will be apparent from the reaction formulae (10) through (13), instead of the inorganic calcium compound, there can be used a calcium salt of an organic acid, $(RCOO)_2Ca$, such as calcium formate, calcium acetate, calcium propionate, calcium butyrate or the like. The inorganic calcium compounds and calcium salts of organic acids may be used singly or in combination. In this connection, when the inorganic calcium compound is used for contact with the sulfite-containing aqueous solution, the same is preferred to be employed in the form of powder or a slurry of the calcium compound with water. A filtrate obtained after separation of calcium sulfite from the reaction solution is an aqueous solution containing the organic acid salt (RCOOM), which can be re-used as an aqueous solution containing the organic acid salt for removing sulfur dioxide from the exhaust gas by contact. On the other hand, the thus separated calcium sulfite may be oxidized, if desired, to form calcium sulfate having a high purity.

Therefore, for removing sulfur dioxide from combustion exhaust gas in the form of calcium sulfite, the method of the present invention comprises the steps of: contacting a sulfur dioxide-containing combustion exhaust gas with an aqueous solution containing at least one organic acid salt expressed by the formula

RCOOM (wherein R represents H, $CH_3$, $C_2H_5$ or $C_3H_7$ and M represents an alkali metal or $NH_4$), to dissolve sulfur dioxide in the form of a sulfite in the aqueous solution; contacting the resultant sulfite-containing aqueous solution with at least one calcium compound selected from calcium carbonate, calcium hydroxide, calcium oxide, calcium formate, calcium acetate, calcium propionate and calcium butyrate for reacting the sulfite with the calcium compound to produce calcium sulfite in the reaction solution; separating the calcium sulfite from the reaction solution reaction and circulating the filtrate obtained after separation of the calcium sulfite to the first-mentioned contacting step. In this manner, calcium sulfite which includes a small amount of calcium sulfate can be obtained.

As will be apparent from the above, calcium sulfite can be effectively produced by a so-called liquid-liquid reaction due to existence of the free acid. Even when an inorganic calcium compound such as calcium carbonate, which is extremely poor in solubility in water, is used as a calcium compound, the calcium compound can be suitably consumed by reaction. Moreover, the sulfate which exists in the sulfite-containing aqueous solution can be converted into calcium sulfate. Thus, the method of the present invention is far more advantageous in comparison with the prior-art wet-type method using an alkali sulfite containing aqueous solution since the sulfate-removing step is not required in the present invention.

The sulfite-containing aqueous solution in the first step may be oxidized by means of oxygen or air to convert the sulfite into a sulfate, followed by adding a calcium compound to the sulfate-containing aqueous solution to produce calcium sulfate. In this connection, the same calcium compound as used in the production of calcium sulfite may be also employed and the reaction proceeds in accordance with the afore-mentioned formula (13). Furthermore, a filtrate obtained after separation of calcium sulfate from the reaction solution is an aqueous solution containing an organic acid salt (RCOOM) and can be re-used for removing sulfur dioxide from combustion exhaust gas. The separated calcium sulfate has high purity.

Thus, calcium sulfate can easily be prepared by oxidizing the reaction solution of the first step. Additionally, the recovery of the calcium sulfate from the resultant solution containing calcium sulfate is far more advantageous in comparison with the prior-art wet-type method since the oxidation is more feasible in the aqueous solution.

When sulfur dioxide is removed by contacting the sulfur dioxide-containing combustion exhaust gas with the aqueous solution containing the organic acid salt to convert sulfur dioxide into a sulfite, the free acid formed is often evaporated together with evaporated water or the free acid may be scattered away together with splashed water and entrained in and released into the air with an exhaust gas from which sulfur dioxide has been removed. In order to prevent the release of the free acid into the air, the exhaust gas, which is obtained by removing sulfur dioxide from combustion exhaust gas, is contacted with water or an aqueous alkali solution prior to release of the gas into the air. Alternatively, the exhaust gas may be contacted with an inorganic calcium compound such as calcium carbonate, calcium hydroxide or the like to collect the free acid in the form of a calcium salt. The calcium salt thus collected can be utilized as a calcium source in the case where sulfur dioxide in combustion exhaust gas is removed in the form of calcium sulfite or calcium sulfate. When the calcium salt is used as a calcium source, the organic acid salt is formed in accordance with the afore-mentioned formulae (11) through (13) and finally contained in the filtrate as described hereinbefore. The filtrate can be recirculated to the first step of contacting the combustion exhaust gas. Thus, the loss of the free acid and the environmental pollution resulting from the release of the free acid into the air can be well prevented.

The present invention will be particularly illustrated with respect to the attached drawings. In this illustration sodium acetate is used as the organic acid salt.

Referring now to FIG. 1, a sulfur dioxide-containing combustion exhaust gas is passed through a pipe 1 into a dust collector 2 wherein the gas is contacted with water, circulated through a pipe 3, for removing dust from the gas and humidifying the gas to a predetermined level as well as for cooling the gas, preferably, to below 100° C. Then, the resultant gas is introduced into an absorption tower 7 through a pipe 4. It should be noted that since dust is gradually accumulated in the water in the dust collector 2, a portion of the water may be withdrawn and discharged, or may be subjected to filtration for re-use. In this connection, fresh water may be supplemented to the collector 2 through a pipe 6, if desired.

Moreover, it is preferable to adjust the humidity of the exhaust gas to be introduced into the absorption tower 7 by regulating the amount of water used in the step of removing dusts, thereby concentrating an absorbing solution in the absorption tower 7 to a desired level.

The combustion exhaust gas introduced into the absorption tower 7 is contacted with an absorbing solution, which contains 5–20% by weight of sodium acetate, 0.2–9% by weight of sodium sulfite 0.4–9% by weight of acetic acid, and 0.7–15% by weight of sodium sulfate and which has a pH range of 4–7 and a temperature of 25°–85° C., preferably 50°–70° C., to remove sulfur dioxide from the gas. The resultant gas having a temperature of 50°–90° C. is passed through a pipe 9 into an organic acid collector 14 wherein the gas is contacted and washed with a solution which contains either calcium acetate and calcium carbonate or calcium acetate and calcium hydroxide and which is circulated in the collector 14 though a pipe 15, and then released into the air through a pipe 16. The exhaust gas to be released into the air may be, if necessary, heated by means of a heater 21 and released into the air for preventing generation of white smoke. The solution circulated in the collector 14 through the pipe 15 has a composition of 0.1–10% by weight of calcium acetate, and 0.1–7% by weight of calcium carbonate or calcium hydroxide and is maintained at a temperature of 25°–84° C., preferably 40°–70° C. Calcium carbonate or calcium hydroxide 32 is formed into a slurry in a vessel 23 and introduced into the collector 14 through a pipe 24. On the other hand, a portion or all of the absorbing solution circulated in the absorption tower 7 through the pipe 8 is withdrawn from a pipe 10 and transferred to a reactor 20 wherein calcium carbonate or calcium hydroxide 32 introduced through the pipe 31 is mixed with the absorbing solution and a solution fed from the collector 14 through a pipe 17 at a temperature of 25°–95° C. preferably 40°–85° C., thereby converting sodium sulfite and sodium sulfate contained in the absorbing solution into calcium sulfite and calcium sulfate, respectively. When calcium carbonate is employed in the reactor 20, carbon dioxide is generated. A small amount of sulfur dioxide and free acetic acid are entrained in the generated carbon dioxide gas. In order to prevent the loss of the sulfur dioxide and the acetic acid, the carbon dioxide generated in the vessel 20 is preferred to be introduced into the absorption tower 7 through the pipe 13. The reaction solution obtained after completion of reaction in the reactor 20 is a slurry composed of calcium sulfite and a small amount of calcium sulfate. The slurry is fed to a solid-liquid separator 37 through a pipe 35 and filtered to obtain calcium sulfite 36 which also contains a small amount of calcium sulfate. While, the resultant filtrate contains 10–25% by weight of sodium acetate, below 1% by weight of acetic acid, and 0.5–5% by weight of sodium sulfate and has a pH value of 5.5–7.5. The filtrate is fed through a pipe 29 to a mixing vessel 30, to which the absorbing solution in the absorption tower 7 is fed, through a pipe 33, if necessary, for mixing the filtrate with the solution to react calcium sulfate contained in the filrate with sodium sulfite in the absorbing solution for forming calcium sulfite, the thus formed calcium sulfite-containing filtrate is fed to the absorption tower 7 through a pipe 34 for re-use as an absorbing solution. By continuously repeating the above-mentioned steps, sulfur dioxide existing in combustion exhaust gas can be continuously removed in the form of calcium sulfite. The resultant calcium sulfite may be oxidized to produce calcium sulfate having a high purity.

Figure 2:
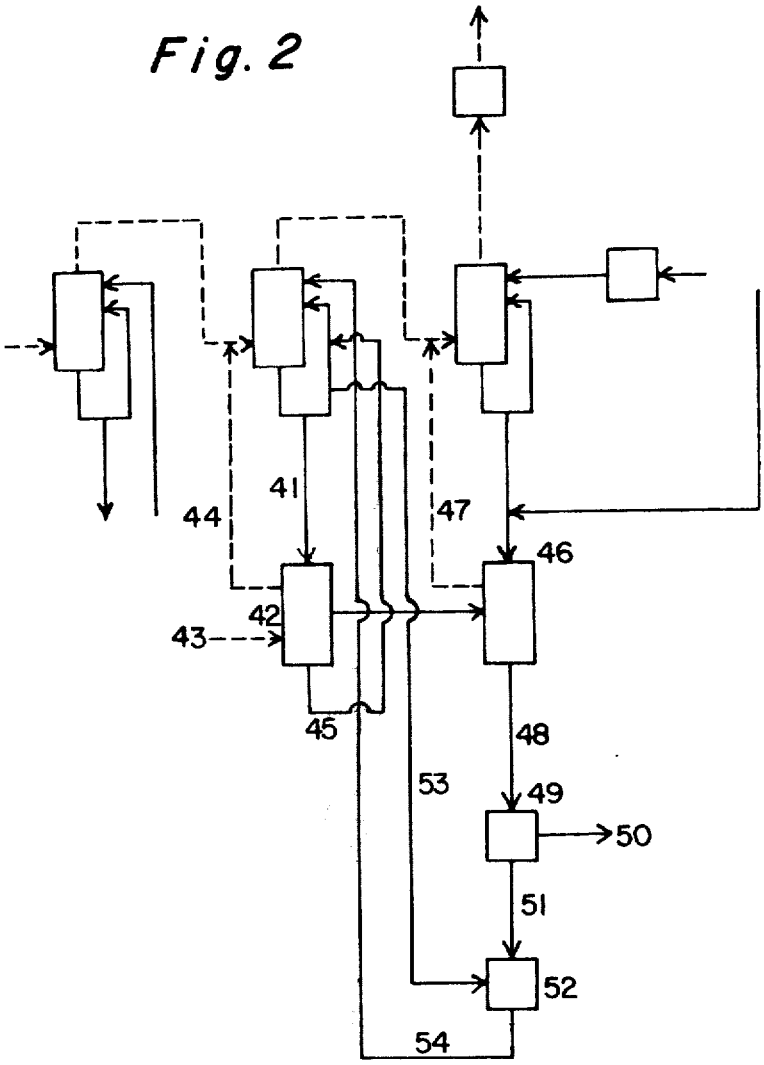
FIG. 2 is a flow chart illustrating another embodiment of the present invention wherein sulfur dioxide in combustion exhaust gas is first formed into a sulfite, which is then oxidized into a sulfate and the resultant sulfate is converted into calcium sulfate.

In FIG. 2, there is shown a flow chart illustrating the oxidation of the sulfite into a sulfate, which is then converted into calcium sulfate. In the illustration, sodium acetate is used as the organic acid salt. The operations by the dust collector 2, the absorption tower 7 and the collector 14 are the same as described with reference to FIG. 1. A portion or all of the absorbing solution circulated in the absorption tower 7 through the pipe 8 is suitably withdrawn through a pipe 41 and discharged into an oxidizing tower 42 for contact with oxygen or air (fed through a pipe 43) maintained at a temperature of 25°–95° C., preferably 40°–85° C. to oxidize sodium sulfite in the absorbing solution into sodium sulfate. The gas released from the oxidizing tower 42 entrains a small amount of sulfur dioxide together with free acetic acid, so that the gas is fed to the absorption tower 7 through a pipe 44. In the oxidation tower 42, the oxidation is carried out until the concentration of sodium sulfite in the absorbing solution reaches below 0.4%. A portion of the resultant solution may be returned to the absorption tower 7 through a pipe 45, if desired. A major portion or all of the solution which is obtained after completion of the oxidation in the oxidizing tower 42 and which contains 5–20% by weight of sodium acetate, less than 0.4% by weight of sodium sulfite, 0.4–9% by weight of acetic acid and 1–15% by weight of sodium sulfate is fed from the tower 42 to the reactor 46 wherein sodium sulfate is converted into calcium sulfate in the same manner as in FIG. 1. In the reactor 46, when calcium carbonate is employed, carbon dioxide is generated and entrains a small amount of free acetic acid. In order to prevent the loss by entrainment of the acetic acid, the gas generated in the reactor 46 may be fed to the collector 14 through a pipe 47, if desired. The reaction solution obtained after completion of reaction in the reactor 46 is a slurry of calcium sulfate. The slurry is fed to a solid-liquid separator 49 through a pipe 48 for filtration to obtain calcium sulfate 50 having high purity. The resultant filtrate has the same composition and pH value as previously shown with respect to FIG. 1. The filtrate is fed to a mixing vessel 52 through a pipe 51. At the same time, the absorbing solution in the absorption tower 7 is also fed to the mixing vessel 52 through a pipe 53. The resultant mixture is introduced into the absorption tower 7 through a pipe 54 and re-used as an absorbing solution. By continuously repeating the above-mentioned processes, sulfur dioxide contained in combustion exhaust gas can be removed in the form of calcium sulfate in a continuous manner.

As will be clear from the foregoing, in accordance with the present invention, sulfur dioxide can be effectively removed in the form of calcium sulfite or calcium sulfate, greatly contributing to the improvement of the sulfur dioxide-containing combustion exhaust gas treatments.

The present invention will now be particularly illustrated by the following examples, which are shown only by way of illustration but not limiting the present invention.

EXAMPLE 1

This example illustrates a process using the dust collector 2, the absorption tower 7 and the organic acid collector 14 of FIGS. 1 and 2, each formed from a glass cylinder having an inner diameter of 10 cm and a length of 100 cm and filled with a porcelain Raschig ring with an outer diameter of 2.54 cm and a length of 2.54 cm.

A gas composed of 1500 ppm of sulfur dioxide, 5% by volume of oxygen, 10% by volume of carbon dioxide and a balance of nitrogen was fed to the dust collector 2 at a feeding rate of 15,000 l/hr for contacting the same with water which was saturated with sulfur dioxide and which was circulated at a rate of 100 l/hr and for humidifying and adjusting the gas to 55° C. The thus contacted gas was then introduced into the absorption tower 7 through a gas-introducing tube. Then, the gas was in turn contacted with 300 l of an absorbing solution, which was circulated at a rate of 100 l/hr at a temperature of 55° C. and which contained 10% by weight of sodium acetate, 3.8% of sodium sulfite, 3.8% by weight of acetic acid, and 4% by weight of sodium sulfate at an initial stage of the contacting operation, for removing sulfur dioxide from the gas. The resultant gas was then fed to the organic acid collector 14 through a gas-feeding tube and contacted with 300 l of a solution, which was circulated at a rate of 100 l/hr through the collector 14 at a temperature of 55° C. and which contained 2% by weight of calcium carbonate, and 3% by weight of calcium acetate, for collecting acetic acid entrained in the gas only in a small amount. The absorbing solution was withdrawn from the absorption tower 7 at a rate of 3 l/hr and a fresh aqueous solution which contained 15% by weight of sodium acetate, 0.1 % by weight of acetic acid and 4% by weight of sodium sulfate was in turn supplied to the absorption tower 7 at a rate of 3 l/hr.

When the gas was treated by means of the dust collector 2, the absorption tower 7 and the collector 14, gas-sampling ports $S_1$, $S_2$, $S_3$ and $S_4$ were provided at an inlet of the dust collector 2, at an inlet of the absorption tower 7, at an inlet of the organic acid collector 14 and at an outlet of the collector 14 respectively, and the gas was withdrawn from the respective ports after a lapse of time for measuring concentrations of sulfur dioxide contained in the withdrawn gas. The measurement was carried out by absorbing sulfur dioxide in a 10% caustic soda solution and the concentration of the absorbed sulfur dioxide was determined in accordance with an iodine method.

The test results are shown in Table 1 below.

TABLE 1

| | Time Lapses After Gas Feeding (Hr) | | | |
|---|---|---|---|---|
| | 0 | 60 | 120 | 240 |
| Concentration of Sulfur | | | | |

TABLE 1-continued

| | Time Lapses After Gas Feeding (Hr) | | | |
|---|---|---|---|---|
| | 0 | 60 | 120 | 240 |
| Dioxide in Gas (ppm) | | | | |
| $S_1$ | | 1480 | 1510 | 1500 |
| $S_2$ | | 1475 | 1480 | 1505 |
| $S_3$ | | 36 | 30 | 42 |
| $S_4$ | | less than 5 | less than 5 | less than 5 |
| Concentration of Acetic Acid in Gas (ppm) | | | | |
| $S_4$ | | less than 10 | less than 10 | less than 10 |
| Absorbing Composition of Solution withdrawn from Absorber 7 (%) | | | | |
| $CH_3COONa$ | 10 | 10.2 | 10.3 | 10.3 |
| $Na_2SO_3$ | 3.8 | 3.7 | 3.4 | 3.5 |
| $CH_3COOH$ | 3.8 | 3.8 | 3.7 | 3.6 |
| $Na_2SO_4$ | 4 | 4.1 | 4.6 | 4.6 |
| Composition of Solution of Collector 14 | | | | |
| $CaCO_3$ | 2 | 1.94 | 1.90 | 1.85 |
| $Ca(CH_3COO)_2$ | 3 | 3 | 3.12 | 3.18 |
| $CaSO_3 \cdot \frac{1}{2}H_2O$ | 0 | — | 0.07 | 0.17 |

It will be apparent from the above Table 1 that sulfur dioxide can be efficiently removed in the absorption tower 7.

EXAMPLE 2

Example 1 was repeated except that various kinds of absorbing solutions as shown in Table 2 were employed with various concentrations and temperatures in the absorption tower 7 instead of the absorbing solution of Example 1.

A predetermined amount of the gas which had been passed through the absorption tower 7 was withdrawn and washed with a 10% caustic soda aqueous solution for collecting sulfur dioxide, which remained in the gas, in the form of sodium sulfite, followed by an analysis in accordance with an iodine method. The concentrations a and b of sulfur dioxide contained in the gas before and after passing the absorption tower 7, respectively, were obtained. Then the rate of absorption of sulfur dioxide in the absorption tower 7 was calculated by the following equation $$\text{Absorption rate (\%)} = \frac{a - b}{a} \times 100$$

The test results are shown in Table 2 below.

TABLE 2

| | Absorbing Solution | Temperature (°C.) | Absorption Rate (%) |
|---|---|---|---|
| 1 | 10% $CH_3COONa$ | 20 | 2299 |
| 2 | 5% $CH_3COONa$ | 20 | 99 |
| 3 | 1% $CH_3COONa$ | 20 | 99 |
| 4 | 0.1% $CH_3COONa$ | 20 | >98 |
| 5 | 5% $CH_3COONH_4$ | 20 | >99 |
| 6 | 1% $CH_3COONH_4$ | 20 | 99 |
| 7 | 5% $CH_3COOK$ | 20 | 99 |
| 8 | 1% $CH_3COOK$ | 20 | 99 |
| 9 | 5% $CH_3COOLi$ | 20 | 99 |
| 10 | 5% $CH_3COORb$ | 20 | 99 |
| 11 | 5% $CH_3COOCs$ | 20 | 99 |
| 12 | 5% $C_2H_5COONa$ | 20 | 99 |
| 13 | 1% $C_2H_5COONa$ | 20 | 99 |
| 14 | 5% $C_2H_5COONH_4$ | 20 | 99 |
| 15 | 5% $C_2H_5COOK$ | 20 | 99 |
| 16 | 5% $C_2H_5COOLi$ | 20 | 99 |
| 17 | 5% $C_2H_5COORb$ | 20 | 99 |
| 18 | 5% $C_2H_5COOCs$ | 20 | 99 |

TABLE 2-continued

| | Absorbing Solution | Temperature (°C.) | Absorption Rate (%) |
|---|---|---|---|
| 19 | 5% $C_2H_7COONa$ | 20 | 99 |
| 20 | 5% $C_2H_7COONH_4$ | 20 | 99 |
| 21 | 5% $C_2H_7COOK$ | 20 | 99 |
| 22 | 5% $CH_3COONa$ | 50 | >98 |
| 23 | 1% $CH_3COONa$ | 50 | 98 |
| 24 | 5% $CH_3COONH_4$ | 50 | 98 |
| 25 | 5% $C_2H_5COONa$ | 50 | 98 |
| 26 | 15% $CH_3COONa$ | 60 | >99 |
| 27 | 20% $CH_3COONa$ | 70 | 99 |
| 28 | 25% $CH_3COONa$ | 85 | 99 |
| 29 | 10% $CH_3COOK$ | 60 | 99 |
| 30 | 15% $CH_3COOK$ | 60 | 99 |
| 31 | 25% $CH_3COOK$ | 60 | 99 |
| 32 | 15% $CH_3COONH_4$ | 60 | 99 |
| 33 | 25% $CH_3COONH_4$ | 60 | 99 |

EXAMPLE 3

Example 1 was repeated except that various kinds of absorbing solutions were used at various concentrations and at temperatures of 20° C., 50° C. or 60° C. The test results are shown in Table 3 below.

TABLE 3

| | | Temperature (°C.) | Absorption Rate (%) |
|---|---|---|---|
| 34 | 5% $CH_3COONa$<br>3% $CH_3COOH$ | 20 | >99 |
| 35 | 3% $C_2H_5COONa$<br>3% $C_2H_5COOK$ | 20 | 99 |
| 36 | 3% $CH_3COONa$<br>3% $CH_3COONH_4$<br>2% $CH_2COOH$ | 20 | 99 |
| 37 | 5% $CH_3COONa$<br>3% $CH_2COOH$<br>2% $Na_2SO_4$ | 20 | 99 |
| 38 | 5% $CH_3COONa$<br>3% $CH_3COOH$<br>2% $Na_2SO_4$ | 50 | >98 |
| 39 | 5% $C_2H_5COONa$<br>3% $C_2H_5COOH$<br>2% $Na_2SO_4$ | 50 | 98 |
| 40 | 10% $CH_2COONa$<br>4% $Na_2SO_3$<br>4% $CH_3COOH$<br>4% $Na_2SO_4$ | 60 | >98 |
| 41 | 10% $CH_3COOK$<br>4% $K_2SO_3$<br>4% $CH_2COOH$<br>4% $K_2SO_4$ | 60 | 98 |

The following Example 4 through 13 illustrate after-treatments of various kinds of absorbing solutions obtained in Examples 2 and 3.

EXAMPLE 4

To 1000 cc of an aqueous solution which contained 9.2% by weight of sodium sulfate and 7.3% by weight of acetic acid was added 30.5 g of calcium carbonate over a 5-minute period with vigorous agitation. The resultant solution was continuously agitated for 3 hours at 50° C. to form a product. The product was filtered and washed with water to obtain 47.3 g of a white cake. The cake contained 34.0 g of calcium sulfate and the balance of water.

EXAMPLE 5

30.5 g of calcium carbonate was added to 1000 cc of an aqueous solution, which contained 8.5% by weight of ammonium sulfate and 7.3% by weight of acetic acid, over a 5-minute period under vigorous agitation, followed by agitation for 3 hours at 50° C. The resultant product was filtered and washed with water to obtain 45.2 g of white cake. The cake contained 31.9 g of calcium sulfate and the balance of water.

EXAMPLE 6

30.5 g of calcium carbonate was added to 1000 cc of an aqueous solution, which contained 9.2% by weight of sodium sulfate and 8.5% by weight of propionic acid, at 50° C. over a 5-minute period while agitating, followed by further agitation for 3 hours at 50° C. The resultant product was filtered and washed with water to obtain 46.3 g of a white cake, which contained 32.0 g of calcium sulfate and the balance of water.

EXAMPLE 7

30.5 g of calcium carbonate was added to 1000 cc of an aqueous solution, which contained 7.5% by weight of sodium sulfite and 8.5% by weight of acetic acid, at 50° C. over a 5-minute period with agitation, followed by further agitation at 50° C. for 3 hours. The resultant product was filtered and washed with water to obtain 47.5 g of a white cake, which contained 34.6 g of calcium sulfite and the balance of water.

EXAMPLE 8

20 l/min of air was fed into an aqueous solution, which contained 7.5% by weight of sodium sulfite, 8.5% by weight of acetic acid and 20% by weight of sodium sulfate, at 50° C. with vigorous agitation. 3 hours after the feeding, only a trace of sodium sulfite was recognized.

EXAMPLE 9

The filtrate of Example 4 which contained about 5% by weight of sodium acetate, about 3.6% of acetic acid and about 4% of sodium sulfate was used as an absorbing solution at 20° C. in the same manner as in Example 1. The absorption rate was greater than 98%.

EXAMPLE 10

200 l/hour of air was fed into 1 l of an aqueous solution, which contained 10.2% by weight of sodium acetate, 3.5% by weight of sodium sulfite, 3.6% by weight of acetic acid and 4.6% of sodium sulfate, at 50° C. with violent agitation. 3 hours after the feeding, the aqueous solution contained 10.2% by weight of sodium acetate, a trace of sodium sulfite, 3.7% by weight of acetic acid and 9.5% by weight of sodium sulfate.

EXAMPLE 11

30 g of calcium carbonate was added to 1 l of an aqueous solution, which contained 10% by weight of sodium acetate, 4% by weight of acetic acid and 9% of sodium sulfate, at 50° C. over a 5-minute period with agitation. 1 hour after the addition, the resultant product was filtered and washed with water to obtain 44.8 g of a white cake, which contained 41.2 g of $CaSO_3.2H_2O$ and the balance of water. On the other hand, the filtrate contained 15.2% by weight of sodium acetate, 0.5% by weight of acetic acid, and 5.1% by weight of sodium sulfate.

EXAMPLE 12

44 g of calcium carbonate was added to 1 l of an aqueous solution, which contained 10% by weight of sodium acetate, 3.4% by weight of sodium sulfite, 4.9% by weight of acetic acid and 3.2% by weight of sodium sulfate, at 50° C. over a 10-minute period with agitation. 1 hour after the addition, the resultant product was filtered and washed with water to obtain 63.8 g of a white cake, which contained 37.4 g of $CaSO_3 . \frac{1}{2}H_2O$, 19.4 g of $CaSo_4.2H_2O$ and the balance of water. On the other hand, the filtrate contained 15.8% by weight of sodium acetate, less than 0.1% by weight of sodium sulfite, less than 0.1% by weight of acetic acid and 1.3% by weight of sodium sulfate and less than 0.3% by weight of $CaSO_4$.

EXAMPLE 13

200 l/hr of air was blown into 1 l of an aqueous solution, which contained 15% by weight of sodium acetate, 0.2% by weight of acetic acid, 4% by weight of sodium sulfate, 4% by weight of calcium sulfite ($CaSO_3 . \frac{1}{2}_2O$), at 50° C. while agitating. 3 hours after the blowing, the resultant crystal was filtered and washed with water to obtain 56.5 g of a white cake, which contained 49.2 g of $CaSO_4 . 2H_2O$, 1.3 g of $CaSO_3 . \frac{1}{2}H_2O$ and the balance of water. On the other hand, the resultant filtrate contained 15.3% by weight of sodium acetate, 0.2% by weight of acetic acid and 4.1 % by weight of sodium sulfate.

What is claimed is:

1. A method of removing sulfur dioxide from combustion exhaust gas containing said sulfur dioxide, comprising contacting said combustion exhaust gas with an aqueous solution containing at least one organic acid salt selected from the group consisting of alkali metal salts or ammonium salts of acetic acid, propionic acid and butyric acid to dissolve the sulfur dioxide contained in the combustion exhaust gas in the form of alkali sulfite and alkali sulfate in said aqueous solution and to generate organic acid in said aqueous solution, adding into the resultant solution which contains alkali sulfite, alkali sulfate and organic acid dissolved therein a calcium compound selected from the group consisting of calcium carbonate, calcium oxide, calcium hydroxide and calcium salt of an organic acid for reaction of said alkali sulfite and said alkali sulfate contained in said solution with said calcium compound to produce calcium sulfite and calcium sulfate which precipitate in said solution resulting in formation of said organic acid salt in said solution, and recycling the organic acid saltcontaining solution obtained after separation of said calcium sulfite and said calcium sulfate for contact with said combustion exhaust gas.

2. The method of claim 1 in which said calcium salt of an organic acid is calcium salt of acetic acid, propionic acid, or butyric acid.

3. A method of removing sulfur dioxide from combustion exhaust gas containing said sulfur dioxide, comprising contacting said combustion exhaust gas with an aqueous solution containing at least one organic acid salt selected from the group consisting of alkali metal salts or ammonium salts of acetic acid, propionic acid and butyric acid to dissolve the sulfur dioxide contained in the combustion exhaust gas in the form of alkali sulfite and alkali sulfate in said aqueous solution and to generate organic acid in said aqueous solution, contacting the resultant solution which contains alkali sulfite, alkali sulfate and organic acid dissolved therein with oxygen or oxygen-containing gas to oxidize said alkali sulfite contained in said solution into alkali sulfate, adding a calcium compound selected from the group consisting of calcium carbonate, calcium oxide, calcium hydroxide and calcium salt of an organic acid into said solution for reaction of said alkali sulfate contained in said solution with said calcium compound to produce calcium sulfate which precipitates in said solution resulting in formation of said organic acid salt in said solution, and recycling the organic acid salt-containing solution obtained after separation of said calcium sulfate for contact with said combustion exhaust gas.

4. The method of claim 3 in which said calcium salt of an organic acid is calcium salt of acetic acid, propionic acid, or butyric acid.

*5. A method of claim 1 wherein said calcium compound is calcium hydroxide.*

*6. A method of claim 1 wherein said calcium compound is calcium carbonate.*

*7. A method of claim 3 wherein said calcium compound is calcium hydroxide.*

*8. A method of claim 3 wherein said calcium compound is calcium carbonate.*

* * * * *

UNITED STATES PATENT AND TRADEMARK OFFICE

CERTIFICATE OF CORRECTION

PATENT NO. : Re. 31,236

DATED : Reissued May 10, 1983

INVENTOR(S) : Shigeru Saitoh et al

It is certified that error appears in the above-identified patent and that said Letters Patent is hereby corrected as shown below:

Under [75] Inventors, please delete "Tetsuya Watanabe;", "; Kunihide Yaguchi; Kenji Kodama; Tamostu Miyamori".

Signed and Sealed this

*Twenty-fifth* Day of *October 1983*

[SEAL]

*Attest:*

GERALD J. MOSSINGHOFF

*Attesting Officer*

*Commissioner of Patents and Trademarks*